United States Patent
Yoo et al.

(10) Patent No.: US 10,186,053 B2
(45) Date of Patent: Jan. 22, 2019

(54) METHOD AND APPARATUS FOR PERFORMING PATH RENDERING

(71) Applicant: Samsung Electronics Co., Ltd., Suwon-si (KR)

(72) Inventors: Jeongjoon Yoo, Hwaseong-si (KR); Soojung Ryu, Hwaseong-si (KR); Seokyoon Jung, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 111 days.

(21) Appl. No.: 14/518,473

(22) Filed: Oct. 20, 2014

(65) Prior Publication Data

US 2015/0310636 A1    Oct. 29, 2015

(30) Foreign Application Priority Data

Apr. 23, 2014  (KR) .................. 10-2014-0048879

(51) Int. Cl.
| | |
|---|---|
| G09G 5/02 | (2006.01) |
| G06T 11/00 | (2006.01) |
| G06T 15/80 | (2011.01) |
| G06T 9/00 | (2006.01) |
| G06T 1/20 | (2006.01) |

(Continued)

(52) U.S. Cl.
CPC .............. *G06T 11/001* (2013.01); *G06T 1/20* (2013.01); *G06T 5/009* (2013.01); *G06T 9/00* (2013.01); *G06T 11/203* (2013.01); *G06T 11/40* (2013.01); *G06T 15/80* (2013.01); *G09G 5/02* (2013.01); *G06T 2200/28* (2013.01); *G06T 2207/10024* (2013.01)

(58) Field of Classification Search
CPC ......... G09G 5/02; G06T 11/001; G06T 15/80; G06T 9/00
See application file for complete search history.

(56) References Cited

U.S. PATENT DOCUMENTS

| | | | |
|---|---|---|---|
| 6,084,596 A | 7/2000 | Politis | |
| 7,408,553 B1 * | 8/2008 | Toksvig | .................. G06T 11/40 345/423 |

(Continued)

FOREIGN PATENT DOCUMENTS

| | | |
|---|---|---|
| CN | 101465973 A | 6/2009 |
| CN | 101996414 A | 3/2011 |

(Continued)

OTHER PUBLICATIONS

Humphreys, Greg, et al. "Chromium: A Stream-Processing Framework for Interactive Rendering on Clusters." ACM Transactions on Graphics (TOG). vol. 21. No. 3. ACM, 2002. (10 pages, in English).

(Continued)

*Primary Examiner* — Matthew Salvucci
(74) *Attorney, Agent, or Firm* — Harness, Dickey & Pierce, P.L.C.

(57) ABSTRACT

A method of performing path rendering, includes acquiring information of vertexes in an object to be rendered in a frame, and calculating a winding number of a pixel in the frame, based on a relationship between a position of the pixel and a proceeding direction of a path connecting the vertexes. The method further includes determining whether to assign a color to the pixel, based on the winding number.

33 Claims, 12 Drawing Sheets

(51) Int. Cl.
*G06T 5/00* (2006.01)
*G06T 11/20* (2006.01)
*G06T 11/40* (2006.01)

(56) References Cited

U.S. PATENT DOCUMENTS

| | | |
|---|---|---|
| 7,817,152 B2 | 10/2010 | Kokojima |
| 7,821,514 B2 | 10/2010 | Kokojima |
| 2002/0145616 A1 | 10/2002 | Doan |
| 2003/0122821 A1 | 7/2003 | Politis |
| 2010/0265254 A1 | 10/2010 | Liland et al. |
| 2011/0285711 A1 | 11/2011 | Kilgard |
| 2011/0285741 A1 | 11/2011 | Kilgard |
| 2012/0249569 A1 | 10/2012 | Kokojima |
| 2014/0043342 A1* | 2/2014 | Goel .................. G06T 9/00 345/501 |
| 2015/0023595 A1* | 1/2015 | Perry .................. G06T 11/203 382/173 |

FOREIGN PATENT DOCUMENTS

| | | |
|---|---|---|
| CN | 102737401 A | 10/2012 |
| JP | 4157569 B2 | 10/2008 |
| JP | 4366387 B2 | 11/2009 |
| JP | 2007-304871 A | 8/2011 |
| WO | WO 2010/133833 A2 | 11/2010 |
| WO | WO 2010/133833 A3 | 11/2010 |

OTHER PUBLICATIONS

Shreiner, Dave, et al. "OpenGL Programming Guide Fourth Edition: The Official Guide to Learning OpenGL, Version 1.4." (2004). (4 pages, in English).

Liland, Eivind Lyngsnes. "Path Rasterizer for OpenVG." (2007). (170 pages, in English).

Extended European Search Report dated Sep. 21, 2015, in counterpart European Application No. 15163022.5 (12 pages, in English).

Charles Loop, et al., "Resolution Independent Curve Rendering using Programmable Graphics Hardware," *Proceedings of the SIGGRAPH ACM Transactions on Graphics (TOG)*, Los Angeles, California, Jul. 31-Aug. 4, 2005, vol. 24, Issue 3 (10 pages, in English).

Yoshiyuki Kokojima, et al., "Resolution Independent Rendering of Deformable Vector Objects using Graphics Hardware," *Proceedings of the SIGGRAPH ACM Sketches*, Article No. 118, Jul. 30-Aug. 30, 2006 (1 page, in English).

Eli Maor: "Vertex", In: "The Facts on File—Calculus Handbook", Jan. 1, 2003 (Jan. 1, 2003), Facts on File Inc., XP55333724, ISBN: 978-0-8160-4581-5, p. 33-34, 46-47, 69-71, 103.

Allen Sherrod: "Stencil Buffers", In: "Game Graphics Programming - Chapter 4 Rasterization", Jan. 1, 2008 (Jan. 1, 2008), Course technology, XP55333732, ISBN: 978-1-58450-516-7, pp. 147-150.

Office Action for Corresponding European Patent Application No. 15163022.5 dated Jan. 20, 2017.

Office Action for Corresponding Chinese Patent Application No. 201410784743.2 dated Sep. 29, 2018.

* cited by examiner

FIG. 3A
FIG. 3B
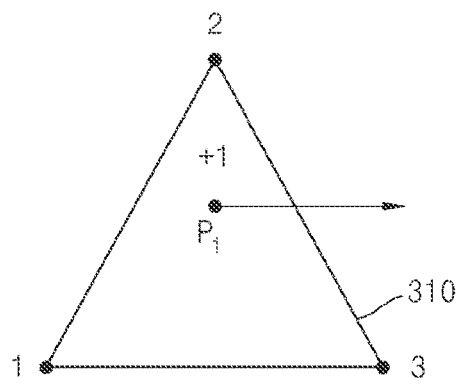
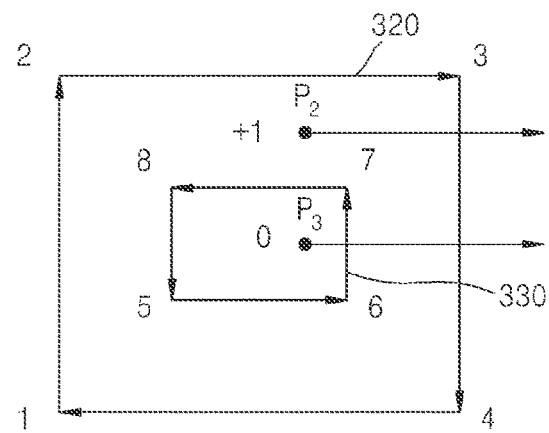

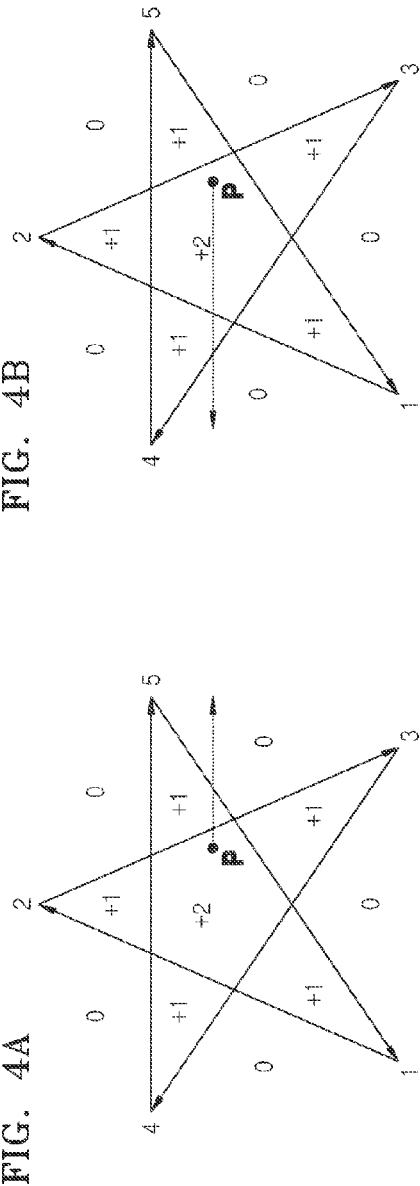
FIG. 4A
FIG. 4B
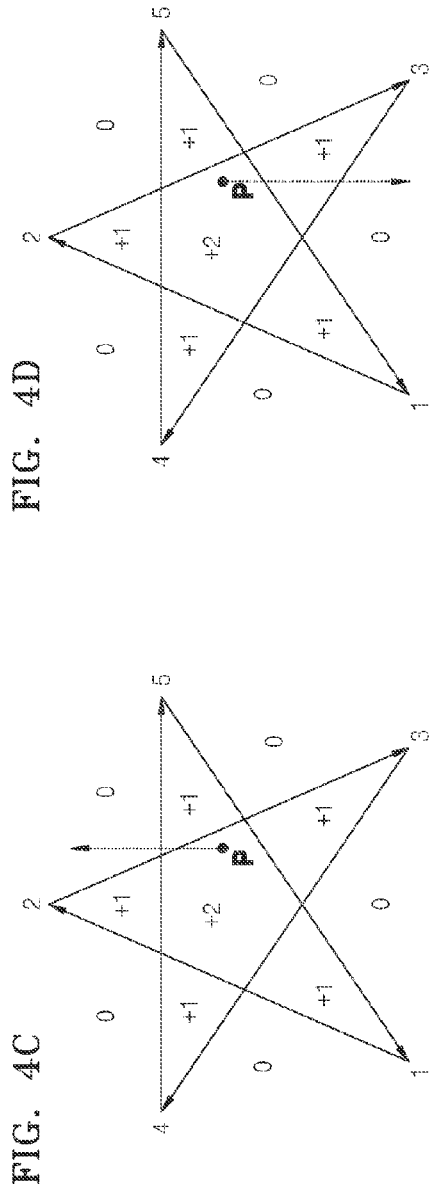
FIG. 4C
FIG. 4D

FIG. 5

```
for(i=0 ; i < num_of_edge ; i++) {
    is_left = isLeftSide(Edge[i], p); // is the pixel located in left side of the edge?
    if (is_left) { // check_direction
        switch (edge's direction) {
            case CW : n = n + 1; break; // clockwise or vtx[prev] > vtx[now]
            case CCW : n = n - 1; break; // anticlockwise or vtx[prev] < vtx[now]
        }
    }
} int isLeftSide(Point v1, Point v2, Point p) { // v1: begin_vertex, v2: end_vertex, p: pixel
    if (v1.y < p.y <v2.y) // (assume that v1.y < v2.y)
        return (v2.x−v1.x)*(p.y−v1.y)−(p.x−v1.x)*(v2.y−v1.y);
    else return 0;
}
```

METHOD AND APPARATUS FOR PERFORMING PATH RENDERING

CROSS-REFERENCE TO RELATED APPLICATION

This application claims the benefit under 35 USC 119(a) of Korean Patent Application No. 10-2014-0048879, filed on Apr. 23, 2014, in the Korean Intellectual Property Office, the entire disclosure of which is incorporated herein in by reference for all purposes.

BACKGROUND

1. Field

The following description relates to a method and apparatus for performing path rendering.

2. Description of Related Art

A study has recently been conducted on a method of improving acceleration performance of a graphics processing unit (GPU) when vector graphics or path rendering is performed. A hardware structure of a GPU is designed on an assumption that all pieces of input data are configured as a triangle in order to accelerate three-dimensional graphics. However, for path rendering, input data is configured, not with triangles, but a combination of a command and a vertex. Accordingly, it is difficult to improve acceleration performance of a GPU when performing path rendering.

For example, in order to draw a curve by using a GPU, a control processing unit (CPU) primarily divides the curve into a plurality of triangles by using a start point of the curve as a center, and instructs the GPU to reconfigure the divided triangles as a curved line. Accordingly, a lot of time is consumed by the CPU when dividing the curve into a plurality of triangles. Also, the CPU communicates with the GPU whenever calling multiple OpenGL APIs, and a lot of changes occur in the state of the GPU.

In this connection, a stencil-based path rendering method using a stencil buffer in the GPU has been suggested. However, according to the stencil-based path rendering method, data input to/output from memory is excessively generated during rendering, and thus the stencil buffer is incapable of parallel processing. Thus, the improvement in acceleration performance of the GPU is limited.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of performing path rendering, the method including acquiring information of vertexes in an object to be rendered in a frame, calculating a winding number of a pixel in the frame, based on a relationship between a position of the pixel and a proceeding direction of a path connecting the vertexes, and determining whether to assign a color to the pixel, based on the winding number.

The path may be located at a side of the pixel.

The side may include a left side, a right side, an upper side, or a lower side of the position of the pixel.

The method may further include determining the side, based on the position of the pixel and a position of the path.

The calculating may include checking whether the path is located at a side of the pixel, determining whether the proceeding direction of the path is clockwise or counterclockwise, based on a result of the checking, increasing the winding number by a predetermined value in response to the proceeding direction being determined to be clockwise, and decreasing the winding number by the predetermined value in response to the proceeding direction being determined to be counterclockwise.

The predetermined value may be 1.

The calculating may include checking whether the path is located a side of the pixel, determining whether the proceeding direction of the path is clockwise or counterclockwise, based on a result of the checking, decreasing the winding number by a predetermined value in response to the proceeding direction being determined to be clockwise, and increasing the winding number by the predetermined value in response to the proceeding direction being determined to be counterclockwise.

The method may further include setting a bounding box in the frame, based on coordinates of each of the vertexes. The calculating may include calculating the winding number of the pixel in the bounding box.

The setting may include setting the bounding box, based on a maximum value and a minimum value of horizontal coordinates and a maximum value and a minimum value of vertical coordinates, of the coordinates.

The bounding box may be a rectangle including a diagonal line connecting a first coordinate that includes the maximum value of the horizontal coordinates and the maximum value of the vertical coordinates and a second coordinate that includes the minimum value of the horizontal coordinates and the minimum value of the vertical coordinates.

The vertexes may include a vertex corresponding to a start position and a vertex corresponding to an end position of each of at least one path.

The determining may include determining whether to assign a color to the pixel, based on a preset rule.

The preset rule may include a first rule in which a color is assigned to each of pixels that has a winding number that is not 0, or a second rule in which a color is assigned to each of pixels that has a winding numbers that is an odd number.

The method may further include assigning the color to the pixel, based on a result of the determining, and storing the color of the pixel.

A non-transitory computer readable storage medium may store a program including instructions to cause a computer to perform the method.

In another general aspect, there is provided an apparatus configured to perform path rendering, the apparatus including an acquisition unit configured to acquire information of vertexes in an object to be rendered in a frame, an operation unit configured to calculate a winding number of a pixel in the frame, based on a relationship between a position of the pixel and a proceeding direction of a path connecting the vertexes, and a determination unit configured to determine whether to assign a color to the pixel, based on the winding number.

The operation unit may be further configured to determine the side, based on the position of the pixel and a position of the path.

The operation unit may be configured to check whether the path is located at a side of the pixel, determine whether the proceeding direction of the path is clockwise or counterclockwise, based on a result of the checking, increase the winding number by a predetermined value in response to the proceeding direction being determined to be clockwise, and decrease the winding number by the predetermined value in response to the proceeding direction being determined to be counterclockwise.

The operation unit may be configured to check whether the path is located a side of the pixel, determine whether the proceeding direction of the path is clockwise or counterclockwise, based on a result of the checking, decrease the winding number by a predetermined value in response to the proceeding direction being determined to be clockwise, and increase the winding number by the predetermined value in response to the proceeding direction being determined to be counterclockwise.

The apparatus may further include a setting unit configured to set a bounding box in the frame, based on coordinates of each of the vertexes. The operation unit may be configured to calculate the winding number of the pixel in the bounding box.

The setting unit may be configured to set the bounding box, based on a maximum value and a minimum value of horizontal coordinates and a maximum value and a minimum value of vertical coordinates, of the coordinates.

The determination unit may be configured to determine whether to assign a color to the pixel, based on a preset rule.

The apparatus may further include a pixel shader configured to assign the color to the pixel, based on a result of the determining, and a frame buffer configured to store the color of the pixel.

In still another general aspect, there is provided an apparatus configured to generate a winding number of a pixel in a frame, the apparatus being connected to a graphics processing unit that performs path rendering, and the apparatus including a processor configured to receive information of coordinates of a vertex of a path and information of coordinates of the pixel, from the graphics processing unit, calculate a winding number of the pixel, based on the information, and output the winding number to the graphics processing unit.

In yet another general aspect, there is provided an apparatus configured to perform path rendering, the apparatus including an operation unit configured to calculate a winding number of a pixel, based on a direction of a path connecting vertexes of an object, the path being at a side of the pixel, and a determination unit configured to determine whether to assign a color to the pixel, based on the winding number.

The operation unit may be configured to increase the winding number by a predetermined value in response to the direction being determined to be clockwise, and decrease the winding number by the predetermined value in response to the direction being determined to be counterclockwise.

The determination unit may be configured to assign the color to the pixel in response to the winding number not being zero, or assign the color to the pixel in response to the winding number being an odd number.

Other features and aspects will be apparent from the following detailed description, the drawings, and the claims.

BRIEF DESCRIPTION OF THE DRAWINGS

FIGS. 3A and 3B are diagrams illustrating examples in which an operation unit calculates a winding number.

FIGS. 4A, 4B, 4C, and 4D are diagrams illustrating examples in which the operation unit calculates a winding number of a pixel by selecting different sides.

FIG. 5 is a diagram illustrating an example of an algorithm in which the operation unit calculates a winding number of a pixel.

Figure 1:
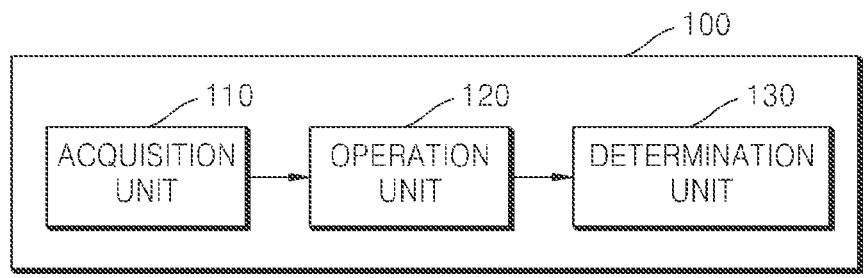
FIG. 1 is a block diagram illustrating an example of an apparatus for performing path rendering.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a block diagram illustrating an example of an apparatus 100 for performing path rendering. Referring to FIG. 1, the apparatus 100 for performing path rendering includes an acquisition unit 110, an operation unit 120, and a determination unit 130. In FIG. 1, only constituent elements of the apparatus 100 for performing path rendering are illustrated. Accordingly, other general constituent elements may be included in the apparatus 100 for performing path rendering in addition to the constituent elements illustrated in FIG. 1.

Also, the acquisition unit 110, the operation unit 120, and the determination unit 130 of the apparatus 100 for performing path rendering illustrated in FIG. 1 may correspond to a single processor or a plurality of processors. A processor may be embodied by an array of a plurality of logic gates or by a combination of a general microprocessor and a memory storing a program that may be executed by the microprocessor. Also, it will be understood by those of ordinary skill in the art that the processor may be embodied in a different form of hardware.

The acquisition unit 110 acquires data including information of vertexes included in an object that is to be rendered. Rendering may be performed along at least one path included within coordinates that define the object. Also, rendering of the object may be performed based on a closed polygon or a closed path that is formed by connecting at least one path. The path signifies a straight line or a curved line connected from one point to another point.

The data acquired by the acquisition unit 110 includes information of coordinates of each vertex and commands for forming a path by combining the vertexes. The vertexes include a vertex corresponding to a start position of a path and a vertex corresponding to an end position of the path.

For example, assuming that a straight line from a first pixel to a second pixel among pixels included in a frame (not shown) is defined to be a path, the vertexes signify points corresponding to the first and second pixels in the frame. Accordingly, the data acquired by the acquisition unit 110 includes coordinates of a first vertex corresponding to the first pixel, coordinates of a second vertex corresponding to the second pixel, and a command for forming a straight line from the first vertex to the second vertex. Accordingly, in addition to obtaining the information of the coordinates of each vertex forming a path, information of a direction of the path may also be obtained by referring to the data. Also, the data may include information of a color value assigned to each pixel.

The operation unit 120 calculates a winding number corresponding to each pixel based on a relationship between a position of each pixel included in the frame and a proceeding direction of at least one path. The winding number N signifies a predetermined value indicating a number of rotations made during rendering of the path, when one side of a respective pixel is viewed.

The winding number N may be calculated by increasing the predetermined value when the path forms a complete circle clockwise and decreasing the predetermined value when the path forms a complete circle counterclockwise, but the present example is not limited thereto. Also, the winding number may be calculated by decreasing the predetermined value when the path forms a complete circle clockwise and increasing the predetermined value when the path forms a complete circle counterclockwise.

In an example, when the path forms the complete circle in the clockwise direction, the winding number of a pixel may be +1. Also, when the path forms the complete circle in the counterclockwise direction, the winding number of the pixel may be −1.

In another example, when the path forms the complete circle in the clockwise direction, the winding number of the pixel may be −1. Also, when the path forms the complete circle in the counterclockwise direction, the winding number of the pixel may be +1.

Also, the predetermined value may be an integer, but the present example is not limited thereto. In other words, when one side is viewed from a position of a pixel, the winding number may correspond, without limitation, to any number that is mapped to the number of rotations rendered during rendering of the path.

In an example, when the path forms the complete circle in the clockwise direction, the winding number of the pixel may be +0.1. Also, when the path forms the complete circle in the counterclockwise direction, the winding number of the pixel may be −0.1.

In another example, when the path forms the complete circle in the clockwise direction, the winding number of the pixel may be −0.5. Also, when the path forms the complete circle in the counterclockwise direction, the winding number of the pixel may be +0.5.

In the following description for convenience of explanation, it is assumed that the winding number is +1 when the path forms the complete circle in the clockwise direction and the winding number is −1 when the path forms the complete circle in the counterclockwise direction. The path may be a closed polygon or a closed path, as described above. The winding number is described in detail with reference to FIG. 2.

Figure 2:
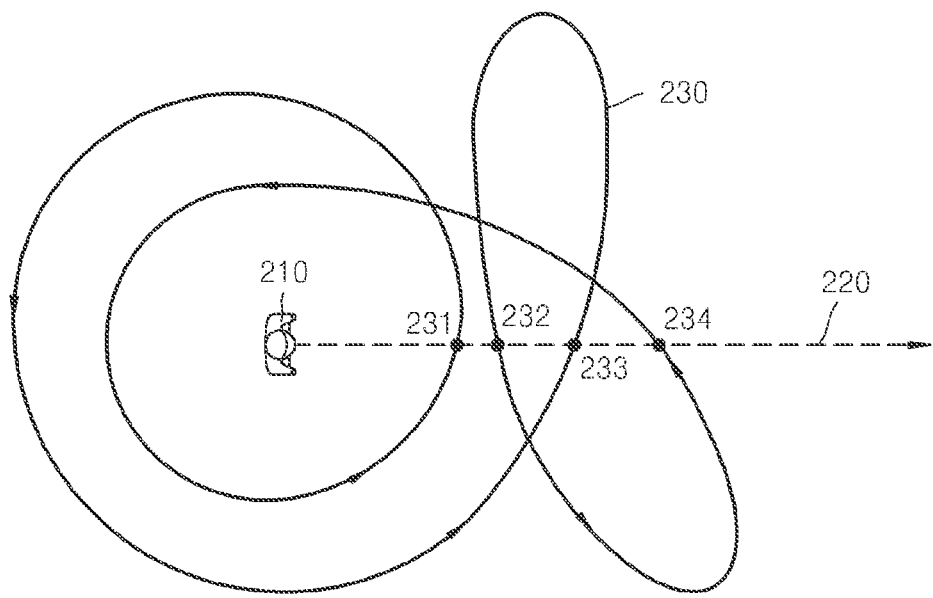
FIG. 2 is a diagram illustrating an example of a winding number.

FIG. 2 is a diagram illustrating an example of a winding number. The winding number corresponds to a pixel 210 of pixels included in a frame. In FIG. 2, for convenience of explanation, the pixel 210 is illustrated as a shape of a person. Referring to FIG. 2, a path 230 is illustrated around the pixel 210, and the path 230 is illustrated as a closed path. Although FIG. 2 illustrates that the winding number of the path 230 is calculated by using the path 230 that is located at a right side of the pixel 210, the present example is not limited to paths located at the right side. Also, the right side of the pixel 210 includes points (referred to below as vertexes) that are positioned along an imaginary half line 220 that is rendered in a horizontal direction, starting from the pixel 210 and toward the right side thereof.

When the imaginary half line 220 is rendered in the horizontal direction, starting from the pixel 210 and toward the right side thereof, the imaginary half line 220 and the path 230 intersect at a total of four vertexes 231, 232, 233, and 234. In other words, the path 230 is rendered to include the four vertexes 231, 232, 233, and 234. Accordingly, the winding number of the pixel 210 is determined based on a direction in which the path 230 is rendered at each of the four vertexes 231, 232, 233, and 234.

In detail, the direction in which the path 230 is rendered at the first vertex 231 is a counterclockwise direction. Accordingly, the winding number of the pixel 210 is primarily calculated to be −1. The direction in which the path 230 is rendered at the second vertex 232 is a clockwise direction, and thus the winding number of the pixel 210 is secondarily calculated to be 0 (−1+1). The direction in which the path 230 is rendered at the third vertex 233 is the counterclockwise direction, and thus the winding number of the pixel 210 is thirdly calculated to be −1 (−1+1−1). The direction in which the path 230 is rendered at the fourth vertex 234 is the counterclockwise direction, and thus the winding number of the pixel 210 is finally calculated to be −2 (−1+1−1−1).

Referring back to FIG. 1, the operation unit 120 calculates a winding number with respect to a path located at one side of a pixel included in a frame. The one side corresponds to any one of left, right, upper, and lower sides with respect to a position of the pixel. Also, the operation unit 120 calculates the winding number considering not only intersection points between the path and an imaginary line drawn from the pixel but also a proceeding direction of the path. The operation unit 120 may calculate the winding number without using a stencil buffer.

In general, a rendering apparatus (not shown), for example, a graphics processing unit (GPU), may perform rendering by using a stencil buffer (not shown). In detail, the rendering apparatus forms triangles by analyzing vertexes included in a path forming an object (triangulation). In other words, the rendering apparatus generates the triangles in the path by connecting three continuous vertexes. Then, the rendering apparatus sequentially writes the generated triangles in the stencil buffer. The rendering apparatus determines a winding number of each of pixels included inside each triangle, and writes a process of determining the winding number and a last winding number in the stencil buffer. The rendering apparatus performs pixel processing by using the last winding number written to the stencil buffer.

Accordingly, when the rendering apparatus performs rendering of an object by using the stencil buffer, a large amount of data input to/output from the stencil buffer is generated. In detail, since data input to/output from the stencil buffer is generated whenever the rendering apparatus renders a triangle that includes the object, the amount of the data input to/output from the stencil buffer increases greatly when a shape of a path rendered by the rendering apparatuses is complicated. Also, parallel processing for rendering a plurality of triangles at a same time is not available in the stencil buffer. Accordingly, since the triangles are sequentially rendered in the stencil buffer, the amount of time required by the rendering apparatus to render the triangles increases greatly as a number of the triangles increases.

The operation unit 120 according to the present example calculates the winding number of each pixel included in the frame without using the stencil buffer. In other words, the operation unit 120 calculates the winding number of each pixel included in the frame without rendering triangles including an object in the stencil buffer. Accordingly, an increase in an amount of data input/output and an increase in a rendering time occurring in a rendering based on the stencil buffer may be prevented.

Also, the operation unit 120 calculates the winding number of each pixel by using a plurality of threads. In other words, the operation unit 120 calculates the winding number of a single pixel by using a single thread. Since the plurality of threads may be parallel processed, the operation unit 120 may simultaneously calculate the winding number of each pixel by using the threads. Accordingly, the apparatus 100 for performing path rendering may perform path rendering at high speed.

In the following description, for convenience of explanation, a method in which the operation unit 120 calculates a winding number of any one of pixels included in a frame by using one thread is described. Accordingly, although it is not described below, it will be understood by those of ordinary skill in the art that the operation unit 120 may simultaneously calculate winding numbers of a plurality of pixels by using a plurality of threads. An example in which the operation unit 120 calculates a winding number is described below in detail with reference to FIGS. 3A and 3B.

FIGS. 3A and 3B are diagrams illustrating examples in which the operation unit 120 calculates a winding number. FIG. 3A illustrates an object 310 including Vertex 1, Vertex 2, and Vertex 3. In detail, the object 310 of FIG. 3A includes a first path from Vertex 1 to Vertex 2, a second path from Vertex 2 to Vertex 3, and a third path from Vertex 3 to Vertex 1.

Data acquired by the acquisition unit 110 includes information of Vertex 1, Vertex 2, and Vertex 3. In detail, the data includes coordinates of Vertex 1, coordinates of Vertex 2, and coordinates of Vertex 3. Also, the data includes information of a vertex indicating a start point of a path forming an object and a vertex indicating an end point of the path. In other words, the data includes information that a start point and an end point of the first path included in the object 310 are Vertex 1 and Vertex 2, respectively, information that a start point and an end point of the second path included in the object 310 are Vertex 2 and Vertex 3, respectively, and information that a start point and an end point of the third path included in the object 310 are Vertex 3 and Vertex 1, respectively. Accordingly, a proceeding direction of a path may be identified based on the information of the vertexes included in the data.

The operation unit 120 checks whether a path is located at one side, based on a position of each of pixels included in a frame. The one side may be any one of left, right, upper, and lower sides with respect to the position of each of the pixels. In the following description, for convenience of explanation, it is assumed that the operation unit 120 checks whether a path is located at a right side of a pixel $P_1$.

The operation unit 120 determines, based on a result of the above check, whether a proceeding direction of the path is clockwise or counterclockwise. For example, when the operation unit 120 determines that the path is located at the right side of the pixel $P_1$, the operation unit 120 then determines whether a proceeding direction of the path is clockwise or counterclockwise. On the other hand, when the operation unit 120 does not determine that the path is located at the right side of the pixel $P_1$, the operation unit 120 determines a winding number of the pixel $P_1$ to be 0.

In detail, the operation unit 120 determines whether a proceeding direction of the second path that is located at the right side of the pixel $P_1$ among the three paths forming the object 310 is clockwise or counterclockwise. In other words, since the first path and the third path are not located at the right side of the pixel $P_1$, the operation unit 120 determines the proceeding direction of only the second path, not proceeding directions of the first path and the third path. Since the second path proceeds from Vertex 2 to Vertex 3, the operation unit 120 determines that the proceeding direction of the second path to be clockwise.

Then, the operation unit 120 determines the winding number of the pixel $P_1$ by adding a predetermined value to the winding number N when the proceeding direction is clockwise and subtracting the predetermined value from the winding number N when the proceeding direction is counterclockwise. The predetermined value may be 1, but the present example is not limited thereto, as described above with reference to FIG. 1.

Assuming that the predetermined value is 1, the operation unit 120 that determined the proceeding direction of the second path to be clockwise determines the winding number of the pixel $P_1$ to be +1. When the operation unit 120 calculates the winding number for each of the pixels included in the frame in the above-described method, the winding numbers of the pixels present inside the object 310 in FIG. 3A (although not shown) are all determined to be +1, and the winding numbers of the pixels present outside the object 310 (although not shown) are all determined to be 0.

Alternatively, the operation unit 120 may determine the winding number of the pixel $P_1$ by subtracting the predetermined value from the winding number when the proceeding direction is clockwise and adding the predetermined value to the winding number when the proceeding direction is counterclockwise. The predetermined value may be 1, but the present example is not limited thereto, as described above with reference to FIG. 1.

Assuming that the predetermined value is 0.1, the operation unit 120 that determined the proceeding direction of the second path to be clockwise determines the winding number of the pixel $P_1$ to be −0.1. When the operation unit 120 calculates the winding number for each of the pixels included in the frame in the above-described method, the winding numbers of the pixels present inside the object 310 in FIG. 3A are all determined to be −0.1, and the winding numbers of the pixels present outside the object 310 are all determined to be 0.

In the following description, for convenience of explanation, when the operation unit 120 determines a winding number of a pixel, it is assumed that 1 is added to the winding number when a proceeding direction of a path is clockwise, and 1 is subtracted from the winding number when the proceeding direction of a path is counterclockwise.

FIG. 3B illustrates a first object 320 including Vertex 1, Vertex 2, Vertex 3, and Vertex 4 and a second object 330 including Vertex 5, Vertex 6, Vertex 7, and Vertex 8. In detail, the first object 320 includes a first path from Vertex 1 to Vertex 2, a second path from Vertex 2 to Vertex 3, a third path from Vertex 3 to Vertex 4, and a fourth path from Vertex 4 to Vertex 1. The second object 330 includes a fifth path from Vertex 5 to Vertex 6, a sixth path from Vertex 6 to Vertex 7, a seventh path from Vertex 7 to Vertex 8, and an eighth path from Vertex 8 to Vertex 5.

The data acquired by the acquisition unit 110 includes information of vertexes indicating a start point and an end point of each of paths forming the first and second objects 320 and 330, as described above. In the following description, for convenience of explanation, it is assumed that the operation unit 120 checks whether a path is located at a right side of a pixel, that is, a pixel $P_2$ or a pixel $P_3$.

In an example, a method of calculating a winding number of the pixel $P_2$ by using the operation unit 120 is described. The operation unit 120 checks whether a path is located at a right side of the pixel $P_2$. In detail, the operation unit 120 checks whether the third path included in the first object 320 is located at the right side of the pixel $P_2$.

The operation unit 120 determines, based on a result of the above check, whether a proceeding direction of a path is clockwise or counterclockwise. In detail, the operation unit 120 determines a proceeding direction of the third path to be clockwise. The operation unit 120 that determined the proceeding direction of the third path to be clockwise determines the winding number of the pixel $P_2$ to be +1.

In another example, a method of calculating a winding number of the pixel $P_3$ by using the operation unit 120 is described. The operation unit 120 checks whether the sixth path included in the second object 330 and the third path included in the first object 320 are located at a right side of the pixel $P_3$.

Then, the operation unit 120 determines that a proceeding direction of the sixth path is counterclockwise and the proceeding direction of the third path is clockwise. The operation unit 120 determines the winding number of the pixel $P_3$ to be −1 based on the proceeding direction of the sixth path determined as counterclockwise, and then finally determines the winding number of the pixel $P_3$ to be 0 (−1+1) based on the proceeding direction of the third path determined as clockwise.

When the operation unit 120 calculates the winding number for each of the pixels included in the frame in the above-described method, the winding numbers of pixels present inside the first object 320 but outside the second object 330 in FIG. 3B (although pixels other than $P_2$ are not shown) are all determined to be +1, whereas the winding numbers of pixels present inside the second object 330 (although pixels other than $P_3$ are not shown) are all determined to be 0.

On the other hand, even when the operation unit 120 calculates the winding numbers by selecting any one of left, right, upper, and lower sides with respect to a position of a pixel, a same operation result obtained above may be obtained. An example in which the operation unit 120 calculates a winding number of a pixel by selecting different sides is described below with reference to FIGS. 4A, 4B, 4C, and 4D.

FIGS. 4A, 4B, 4C, and 4D are diagrams illustrating examples in which the operation unit 120 calculates a winding number of a pixel by selecting different sides. FIGS. 4A to 4D illustrate objects, each including Vertexes 1 to 5. The objects illustrated in FIGS. 4A to 4D are closed polygons having a star shape, and are all identical to one another.

Referring to FIG. 4A, the operation unit 120 checks whether a path is located at a right side with respect to a position of a pixel P. In detail, the operation unit 120 checks whether a path from Vertex 2 to Vertex 3 and a path from Vertex 5 to Vertex 1 exist at the right side of the pixel P, for example, at positions on an imaginary half line drawn in a horizontal direction to the right side of the pixel P. Since proceeding directions of both the path from Vertex 2 to Vertex 3 and the path from Vertex 5 to Vertex 1 are clockwise, the operation unit 120 calculates a winding number of the pixel P to be +2.

Referring to FIG. 4B, the operation unit 120 checks whether a path is located at a left side of the pixel P. In detail, the operation unit 120 checks whether a path from Vertex 1 to Vertex 2 and a path from Vertex 3 to Vertex 4 exist at the left side of the pixel P, for example, whether paths exist that intersect an imaginary half line drawn in a horizontal direction to the left side of the pixel P. Since proceeding directions of both the path from Vertex 1 to Vertex 2 and the path from Vertex 3 to Vertex 4 are clockwise, the operation unit 120 calculates the winding number of the pixel P to be +2.

Referring to FIG. 4C, the operation unit 120 checks whether a path is located at an upper side with respect to the position of the pixel P. In detail, the operation unit 120 checks whether the path from Vertex 2 to Vertex 3 and a path from Vertex 4 to Vertex 5 exist at the upper side of the pixel P, for example, at positions on an imaginary half line drawn in a vertical direction to the upper side of the pixel P. Since proceeding directions of both the path from Vertex 2 to Vertex 3 and the path from Vertex 4 to Vertex 5 are clockwise, the operation unit 120 calculates the winding number of the pixel P to be +2.

Referring to FIG. 4D, the operation unit 120 checks whether a path is located at a lower side with respect to the position of the pixel P. In detail, the operation unit 120 checks whether the path from Vertex 5 to Vertex 1 and the path from Vertex 3 to Vertex 4 exist at the lower side of the pixel P, for example, at positions on an imaginary half line drawn in a vertical direction to the lower side of the pixel P. Since proceeding directions of both the path from Vertex 5 to Vertex 1 and the path from Vertex 3 to Vertex 4 are clockwise, the operation unit 120 calculates the winding number of the pixel P to be +2.

As described above, results obtained by the operation unit 120 in calculating the winding number with respect to the position of the pixel P are the same, regardless of which side is selected. Also, as illustrated in FIGS. 4A to 4D, respective winding numbers of pixels present within a same area among areas divided by paths are the same.

The operation unit 120 may determine one side where a winding number is calculated for each of pixels included in a frame considering a position of a pixel and a position of a path. In other words, the operation unit 120 may determine how to calculate the winding number by selecting a side with respect to the position of the pixel P according to the position of the pixel P. In other words, one side for the calculation of the winding number may be determined in a direction in which a least number of paths is expected to be present with respect to the position of the pixel P.

For example, assuming that the pixel P exists at a left side with respect to a vertical center line of the frame, the operation unit 120 may select the left side of the pixel P, rather than the right side, as the side for the calculation of the winding number, and thus the operation unit 120 may calculate the winding number of the pixel P by using the least number of paths. Also, assuming that the pixel P exists at a right side with respect to the vertical center line of the frame, the operation unit 120 may select the right side of the pixel P, rather than the left side, as the side for the calculation of the winding number, and thus the operation unit 120 may calculate the winding number of the pixel P by using the least number of paths.

Accordingly, the operation unit 120 may calculate the winding number by determining a different side for each of the pixels included in the frame. In doing so, the operation unit 120 may determine positions of paths forming an object in the frame. Then, the operation unit 120 may select one side to be used for the calculation of the winding number in a direction in which the least number of paths exists with respect to a position of a pixel whose winding number is to be calculated.

FIG. 5 is a diagram illustrating an example of an algorithm in which the operation unit 120 calculates a winding number of a pixel. The algorithm of FIG. 5 relates to a method of calculating a winding number based on whether a path is located at a right side of a pixel. However, a winding number may be calculated based on a side other than the right side of a pixel as described above. Also, other algorithms may be employed without limitation only if a same result as that of the algorithm of FIG. 5 is output.

Referring back to FIG. 1, the determination unit 130 determines whether to assign a color to each of the pixels by using the winding number calculated by the operation unit 120. In other words, the determination unit 130 determines whether to assign a color to each of the pixels by using the winding number of each of the pixels that is calculated by the operation unit 120. For example, the determination unit 130 may determine whether to assign a color to each of the pixels based on a preset rule. The preset rule may be any one of a first rule in which a color value is assigned to each of pixels having winding numbers that are not 0, and a second rule in which a color value is assigned to each of pixels having winding numbers that are odd numbers. An example in which the determination unit 130 determines whether to assign a color to each of the pixels is described with reference to FIGS. 6A, 6B, and 6C.

Figure 6A:
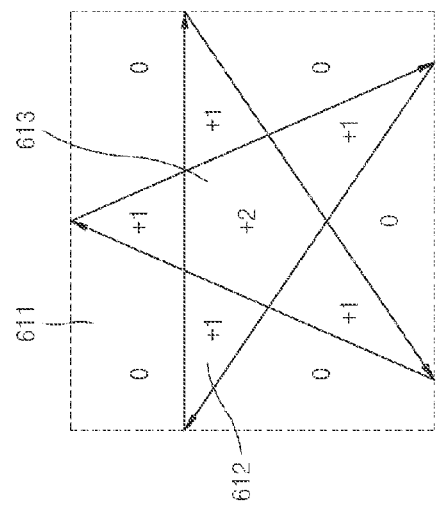
FIGS. 6A, 6B, and 6C are diagrams illustrating examples in which a determination unit determines whether to assign a color to each pixel.
Figure 6B:
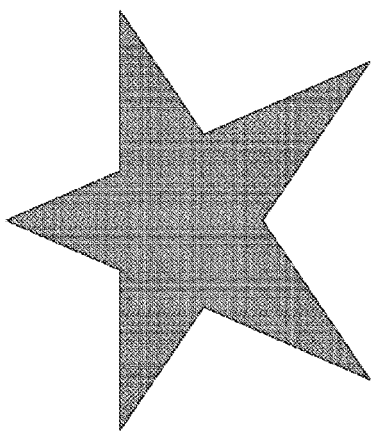
Figure 6C:
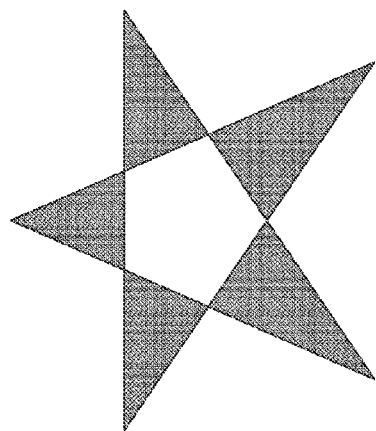

FIGS. 6A, 6B, and 6C are diagrams illustrating examples in which the determination unit 130 determines whether to assign a color to each pixel. FIG. 6A illustrates a result of a calculation of a winding number for each of pixels included in a frame, which is performed by the operation unit 120. FIG. 6B illustrates a result of an assignment of color values to the pixels according to a first rule. Also, FIG. 6C illustrates a result of an assignment of color values to the pixels according to a second rule.

Referring to FIG. 6A, the winding number is calculated for each of the pixels included in the frame. In detail, the winding numbers of pixels included in an area 611 are calculated to be 0, the winding numbers of pixels included in an area 612 are calculated to be +1, and the winding numbers of pixels included in an area 613 are calculated to be +2.

In an example, the determination unit 130 may determine whether to assign a color to each of the pixels according to the first rule. The first rule specifies that a color value is assigned to each of pixels having winding numbers that are not 0. Referring to FIG. 6B, according to the first rule, the determination unit 130 determines that a color is to be assigned to each of the pixels included in the area 612 and the area 613 and a color is not to be assigned to each of the pixels included in the area 611 in FIG. 6A.

In another example, the determination unit 130 may determine whether to assign a color to each of the pixels according to the second rule. The second rule specifies that a color value is assigned to each of pixels having winding numbers that are odd numbers. In the present example, a pixel having a winding number that is an odd number means that an absolute value of the winding number of the pixel is an odd number. For example, when a winding number is +3, the winding number is determined to be an odd number. Also, when a winding number is −3, the winding number is determined to be an odd number. Referring to FIG. 6C, according to the second rule, the determination unit 130 determines that a color is to be assigned to each of the pixels included in the area 612 and a color is not to be assigned to each of the pixels included in the area 611 and the area 613 in FIG. 6A.

The determination unit 130 transmits, to a pixel shader (not shown), information of each of the pixels that is determined to be assigned a color. The pixel shader assigns a color value to each of the pixels that is determined to be assigned a color.

According to the above description, the apparatus 100 for performing path rendering may calculate winding number of each pixel without using the stencil buffer. Accordingly, problems of excessive generation of data input to/output from memory due to use of the stencil buffer and generation of redundant data input to/output from memory due to use of the stencil buffer may be solved. Also, since the apparatus 100 for performing path rendering generates the winding number in parallel with respect to each of pixels included in a frame, path rendering may be performed at high speed, and thus high resolution rendering may be achieved over a short period of time.

Figure 7:
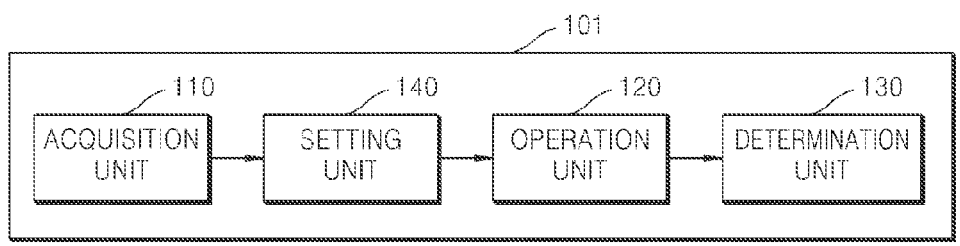
FIG. 7 is a block diagram illustrating another example of an apparatus for performing path rendering.

FIG. 7 is a block diagram illustrating another example of an apparatus 101 for performing path rendering. Referring to FIG. 7, the apparatus 101 for performing path rendering includes the acquisition unit 110, a setting unit 140, the operation unit 120, and the determination unit 130. In FIG. 7, only constituent elements of the apparatus 101 for performing path rendering are illustrated. Accordingly, other general constituent elements may be included in the apparatus 101 for performing path rendering in addition to the constituent elements illustrated in FIG. 7.

Also, the acquisition unit 110, the setting unit 140, the operation unit 120, and the determination unit 130 of the apparatus 101 for performing path rendering illustrated in FIG. 7 may correspond to a single processor or a plurality of processors. A processor may be embodied by an array of a plurality of logic gates or by a combination of a general microprocessor and a memory storing a program that may be executed by the microprocessor. Also, it will be understood by those of ordinary skill in the art that the processor may be embodied in a different form of hardware.

Also, the operations of the acquisition unit 110, the operation unit 120, and the determination unit 130 of the apparatus 101 for performing path rendering illustrated in FIG. 7 are the same as those described above with reference to FIGS. 1 to 6C.

Accordingly, detailed descriptions of the acquisition unit 110, the operation unit 120, and the determination unit 130 are omitted in the following description.

The setting unit 140 sets a bounding box in a frame using a coordinate component of each of vertexes. For example, the setting unit 140 may set the bounding box in the frame by using maximum and minimum values of horizontal coordinate components of the vertexes and maximum and minimum values of vertical coordinate components of the vertexes of coordinate components of the vertexes. The operation unit 120 calculates a winding number of each of pixels included in the bounding box that is set by the setting unit 140. An example in which the setting unit 140 sets a bounding box is described below with reference to FIGS. 8A and 8B.

Figure 8A:
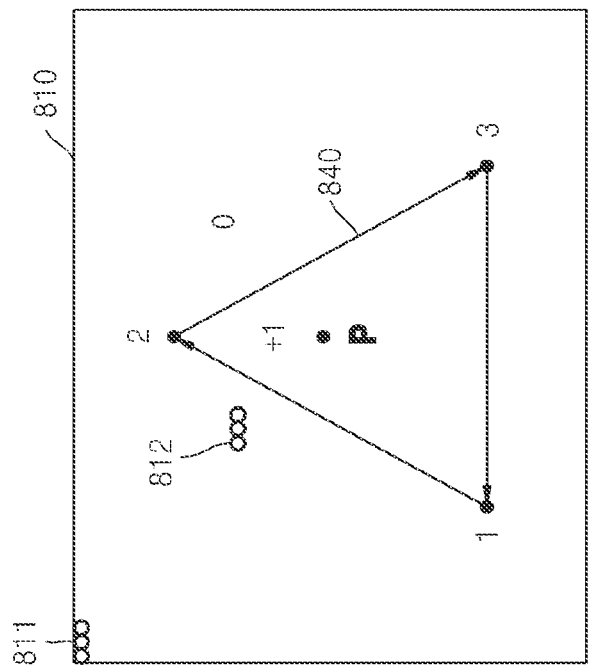
FIGS. 8A and 8B are diagrams illustrating examples in which a setting unit sets a bounding box.
Figure 8B:
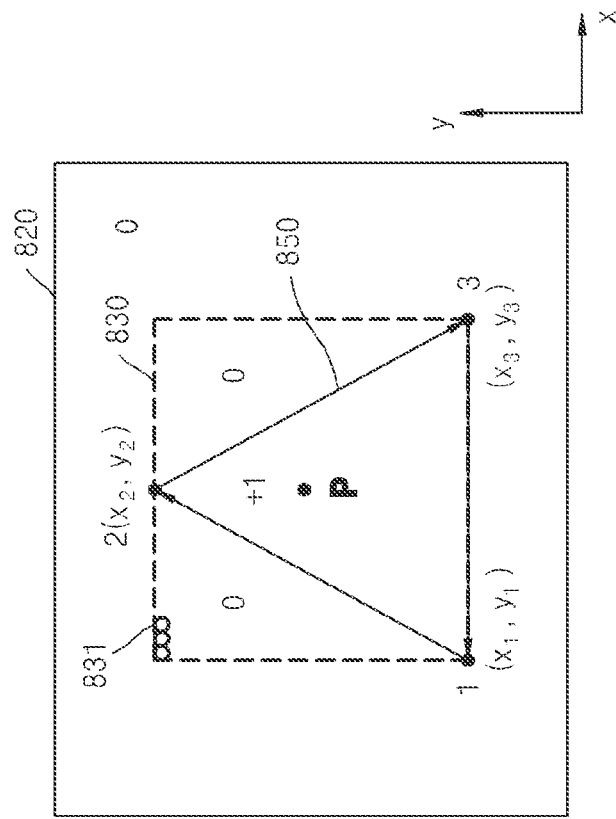

FIGS. 8A and 8B are diagrams illustrating examples in which the setting unit 140 sets a bounding box. FIG. 8A illustrates an object 840 having a triangular shape included in a frame 810. The operation unit 120 calculates a winding number of each of pixels included in the frame 810. Accordingly, when an area occupied by the object 840 is small in an overall area of the frame 810, the operation unit 120 may perform path rendering even when the winding number is not calculated for all of the pixels included in the frame 810. In other words, by calculating the winding numbers of only pixels 812 that are adjacent to the object 840, without calculating the winding numbers of pixels 811 that are spaced far from the object 840, the operation unit 120 may still produce a result that is the same as one which would have been produced had all of the pixels 811 and 812 been calculated. Accordingly, the path rendering may be performed at a fast speed.

Referring to FIG. 8B, the setting unit 140 sets a bounding box 830 in the frame 820. The operation unit 120 calculates a winding number of each of only pixels 831 located inside the bounding box 830. The setting unit 140 sets the bounding box 830 by using coordinates (x1, y1) of Vertex 1, coordinates (x2, y2) of Vertex 2, and coordinates (x3, y3) of Vertex 3, which are included in an object 850.

For example, the setting unit 140 sets a bounding box by using maximum and minimum values of horizontal coordinate components and maximum and minimum values of vertical coordinate components of the coordinates (x1, y1) of Vertex 1, the coordinates (x2, y2) of Vertex 2, and the coordinates (x3, y3) of Vertex 3. First, the setting unit 140 selects a maximum value x3 and a minimum value x1 among x coordinate components (x1, x2, x3) of the vertexes. Then, the setting unit 140 selects a maximum value y2 and a minimum value y1 or y3 among y coordinate components (y1, y2, y3) of the vertexes. Then, the setting unit 140 forms a first coordinate (x3, y2) by using the maximum value x3 among the x coordinate components and the maximum value y2 among the y coordinate components. Also, the setting unit 140 forms a second coordinate (x1, y1) by using the minimum value x1 among the x coordinate components and the minimum value y1 of the y coordinate components. Then, the setting unit 140 sets a rectangle having a diagonal line connecting the first coordinate (x3, y2) and the second coordinate (x1, y1), as the bounding box 830.

According to the above description, as the setting unit 140 sets a bounding box including a minimum number of pixels for performing path rendering, the operation unit 120 may calculate winding numbers only for the minimum number of pixels. Accordingly, the apparatus 100 for performing path rendering may quickly perform path rendering.

Figure 9:
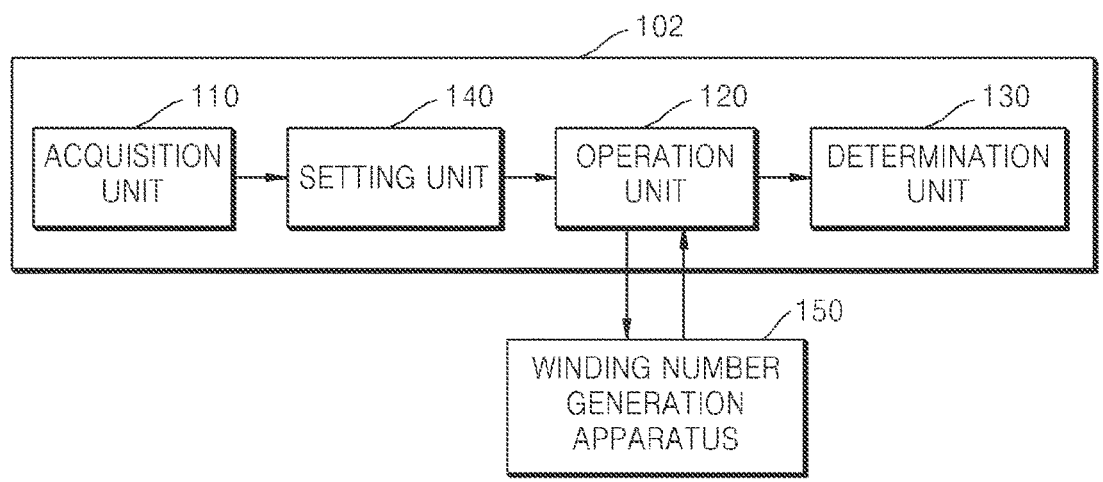
FIG. 9 is a block diagram illustrating an example of a winding number generation apparatus.

FIG. 9 is a block diagram illustrating an example of a winding number generation apparatus 150. The operations of the acquisition unit 110, the setting unit 140, and the determination unit 130 of an apparatus 102 for performing path rendering illustrated in FIG. 9 are the same as those described with reference to FIGS. 1 to 8B. Accordingly, detailed descriptions on the operations of the acquisition unit 110, the setting unit 140, and the determination unit 130 are omitted in the following description.

Also, although FIG. 9 illustrates that the apparatus 102 for performing path rendering includes the setting unit 140 that sets a bounding box, the present example is not limited thereto. In other words, the apparatus 102 for performing path rendering may operate even when it does not include the setting unit 140, as described above with reference to FIG. 7.

Also, the winding number generation apparatus 150 of FIG. 9 may correspond to a single processor or a plurality of processors. A processor may be embodied by an array of a plurality of logic gates or by a combination of a general microprocessor and a memory storing a program that may be executed by the microprocessor. Also, it will be understood by those of ordinary skill in the art that the processor may be embodied in a different form of hardware.

The winding number generation apparatus 150 of FIG. 9 is connected to the apparatus 102 for performing path rendering. The winding number generation apparatus 150 generates a winding number of each of pixels included in a frame. Although FIG. 9 illustrates that the winding number generation apparatus 150 is located outside the apparatus 102 for performing path rendering, the present example is not limited thereto. In other words, the winding number generation apparatus 150 may be located inside the apparatus 102 for performing path rendering.

According to the above description with reference to FIGS. 1 to 8B, a winding number of a pixel is calculated by the operation unit 120 that is included in the apparatus 100 or 101 for performing path rendering. However, according to an example to be described with reference to FIGS. 9 and 10, the winding number of a pixel is calculated by the winding number generation apparatus 150 that is independent of the apparatus 102 for performing path rendering, and is transmitted to the apparatus 102 for performing path rendering. Accordingly, the operation unit 120 transmits information of coordinates of each of vertexes included in path data and coordinates of a pixel included in the frame to the winding number generation apparatus 150, and receives the winding number from the winding number generation apparatus 150.

In detail, the winding number generation apparatus 150 receives the information of the coordinates of each of the vertexes corresponding to at least one path and the coordinates of the pixel included in the frame, from the apparatus 102 for performing path rendering. The winding number generation apparatus 150 calculates the winding number of the pixel by using the received information. The winding number generation apparatus 150 returns the calculated winding number to the apparatus 102 for performing path rendering. An example in which the operation unit 120 and the winding number generation apparatus 150 operate is described in detail with reference to FIG. 10.

Figure 10:
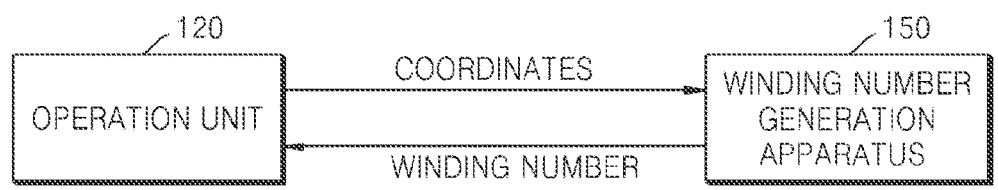
FIG. 10 is a block diagram illustrating an example in which the operation unit and the winding number generation apparatus operate.

FIG. 10 is a block diagram illustrating an example in which the operation unit 120 and the winding number generation apparatus 150 operate. Referring to FIG. 10, the operation unit 120 transmits the coordinates of each of the vertexes included in the path data and the coordinates of the pixel whose winding number is to be calculated, to the winding number generation apparatus 150. The operation unit 120 may transmit the coordinates, or an index of each of the coordinates, of each of the pixels whose winding numbers are to be calculated, to the winding number generation apparatus 150.

The winding number generation apparatus 150 calculates the winding number of each of the pixels included in the frame by using the information of the coordinates that is received from the operation unit 120. A method of calculating a winding number that is performed by the winding number generation apparatus 150 is the same as that performed by the operation unit 120 described with reference to FIGS. 2 to 4D. In other words, the operation unit 120 may transmit information related to the calculation of the winding number to the winding number generation apparatus 150 that exists independently of the apparatus 102 for performing path rendering, and may entrust the winding number generation apparatus 150 with the calculation of the winding number.

The winding number generation apparatus 150 transmits the calculated winding number to the operation unit 120. When the operation unit 120 transmits the coordinates of each of the pixels whose winding numbers are to be calculated, to the winding number generation apparatus 150, the winding number generation apparatus 150 transmits the winding number of each of the pixels to the operation unit 120.

Figure 11:
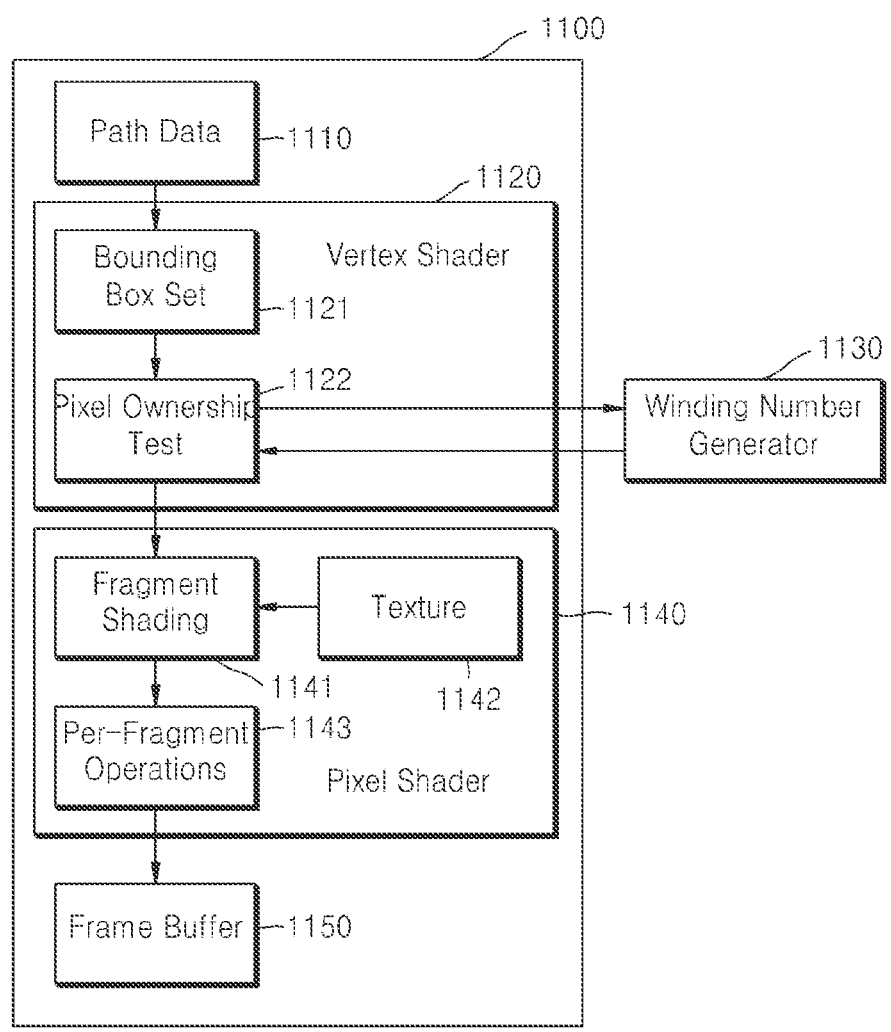
FIG. 11 is a block diagram illustrating an example in which a method of calculating a winding number of a pixel is embodied in a GPU.

FIG. 11 is a block diagram illustrating an example in which a method of calculating a winding number of a pixel is embodied in a GPU 1100. Referring to FIG. 11, the method of calculating the winding number of the pixel that is executed in the GPU 1100 includes operations that may be processed in time-series in the apparatus 100, 101, or 102 for performing path rendering, which are illustrated in FIG. 1, 7, or 9, respectively. Accordingly, it may be understood that, although omitted in the following description, the above-described contents regarding the apparatus 100, 101, or 102 for performing path rendering as illustrated in FIG. 1, 7, or 9, respectively, are applied to the following description with reference to FIG. 11.

Referring to FIG. 11, the GPU 1100 includes a vertex shader 1120, a pixel shader 1140, and a frame buffer 1150. The vertex shader 1120 may be replaced with a shader program or a device such as a geometry shader or a computer shader capable of generating a winding number. In the following description, for convenience of explanation, the vertex shader 1120 is used, but the example is not limited thereto. Also, a winding number generator 1130 is provided in addition to the GPU 1100. The winding number generator 1130 may be included in the GPU 1100 or may be independently located outside the GPU 1100.

The vertex shader 1120 receives an input of path data 1110 including information of vertexes included in an object to be rendered. The path data 1110 includes information of coordinates indicating each of the vertexes and information of vertexes corresponding to a start point and an end point of each of paths forming the object.

The vertex shader 1120 sets a bounding box as needed (1121). The bounding box is an imaginary box including pixels whose winding numbers are to be calculated among pixels included in a frame.

The vertex shader 1120 performs a pixel ownership test on the pixels included in the frame (1122). The pixel ownership test is a process of calculating a winding number of each of the pixels included in the frame, and determining whether to assign a color to each of the pixels. When the vertex shader 1120 sets the bounding box (1121), the pixel ownership test is performed only on the pixels included in the bounding box (1122). When the vertex shader 1120 does not set the bounding box (1121), the pixel ownership test is performed on all of the pixels included in the frame (1122).

The winding number of each pixel is calculated while the vertex shader 1120 performs the pixel ownership test (1122). The vertex shader 1120 may directly calculate the winding number of each pixel or may query the winding number generator 1130 for the winding number of each pixel. An example in which the vertex shader 1120 performs a pixel ownership test (1122) is described in detail with reference to FIG. 12.

Figure 12:
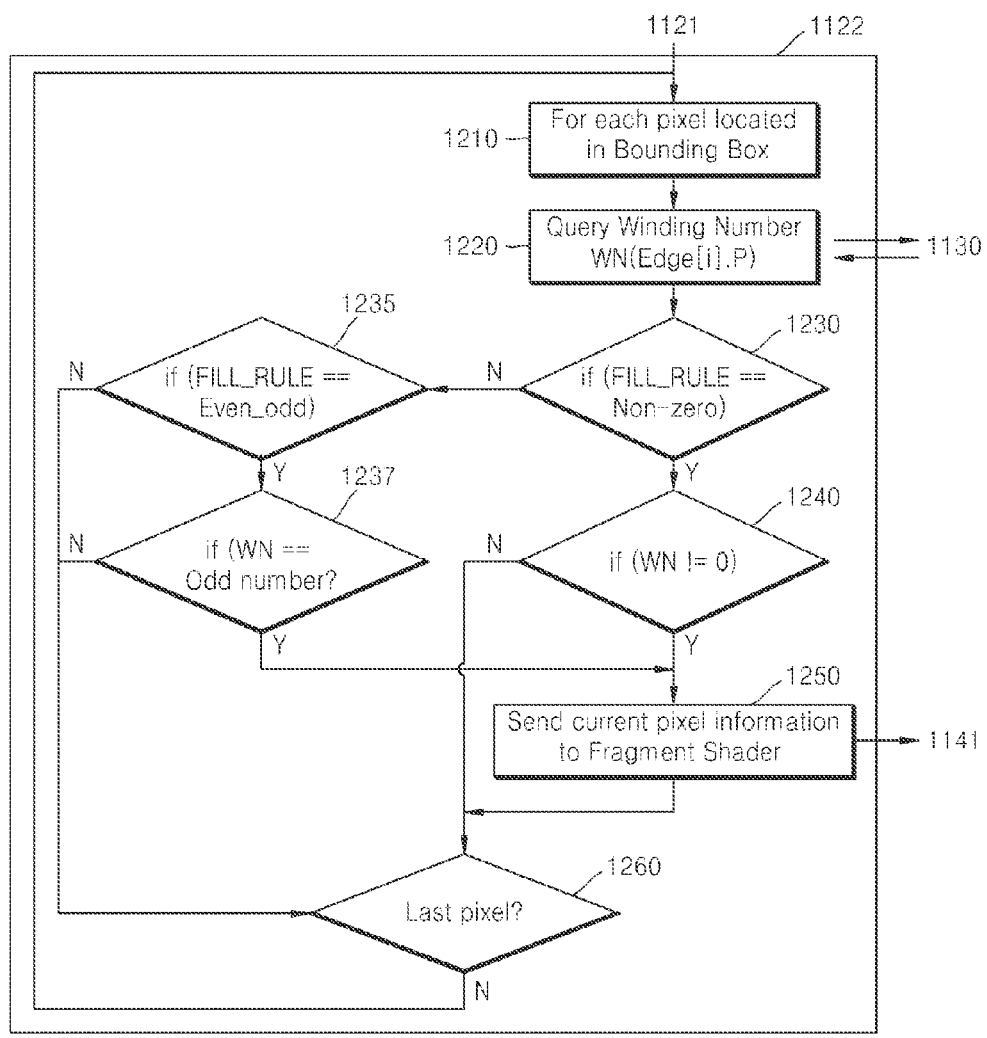
FIG. 12 is a flowchart illustrating an example of a method of performing a pixel ownership test.

FIG. 12 is a flowchart illustrating an example of a method of performing the pixel ownership test (1122). Referring to FIG. 12, the example in which the vertex shader 1120 performs the pixel ownership test (1122) includes operations that may be processed in time-series in the operation unit 120 and the determination unit 130, which are illustrated in FIGS. 1, 7, and 9. Accordingly, although omitted in the following description, the above-described contents regarding the operation unit 120 and the determination unit 130 as illustrated in FIGS. 1, 7, and 9 are applied to the following description with reference to FIG. 12.

In Operation 1210, the vertex shader 1120 checks whether a pixel on which the pixel ownership test is to be performed is located inside the bounding box. If the vertex shader 1120 does not set the bounding box, Operation 1210 is omitted.

In Operation 1220, the vertex shader 1120 calculates a winding number WN of the pixel. If the winding number generator 1130 calculates the winding number of the pixel, the vertex shader 1120 queries the winding number generator 1130 for the winding number of the pixel, and receives the winding number from the winding number generator 1130. The vertex shader 1120 transmits information of the coordinates of each of vertexes, i.e., "Edge[i]" in FIG. 12, and information of the coordinates of the pixel, i.e., "P" in FIG. 12, whose winding number is to be calculated, to the winding number generator 1130, and receives the winding number from the winding number generator 1130. An example in which the winding number generator 1130 calculates a winding number is described in detail with reference to FIGS. 13 to 14.

In Operation 1230, the vertex shader 1120 determines whether to assign a color to each of the pixels included in the frame based on a first rule. The first rule is a non-zero rule specifying that a color value is assigned to each of pixels having the winding number that is not 0. When the vertex shader 1120 determines to assign a color to each of the pixels based on the first rule, the process performs Operation 1240. Otherwise, the process performs Operation 1235.

In Operation 1235, the vertex shader 1120 determines whether to assign a color to each of the pixels included in the frame based on a second rule. The second rule is an even-odd rule in which a color value is assigned to each of pixels having the winding number that is an odd number. When the vertex shader 1120 determines to assign a color to each of the pixels based on the second rule, the process performs Operation 1237. Otherwise, the process performs Operation 1260.

In Operation 1237, the vertex shader 1120 determines whether the winding number of the pixel included in the frame is an odd number. The odd number signifies that an absolute value of the winding number of the pixel is an odd number. For example, when the winding number is +3, the winding number is determined to be an odd number, and when the winding number is −3, the winding number is determined to be an odd number. The vertex shader 1120 performs Operation 1250 with respect to the pixel whose winding number is an odd number and Operation 1260 with respect to the pixel whose winding number is an even number or 0.

In Operation 1240, the vertex shader 1120 determines whether the winding number of the pixel included in the frame is not 0. The vertex shader 1120 performs Operation 1260 for the pixel whose winding number is 0 and Operation 1250 for the pixel whose winding number is not 0.

In Operation 1250, the vertex shader 1120 sends information of the pixel that is determined to be assigned a color, to the pixel shader 1140. For example, the vertex shader 1120 may transmit information of the coordinates of the pixel that is determined to be assigned a color, to a fragment shader included in the pixel shader 1140.

In Operation 1260, the vertex shader 1120 determines whether the pixel on which the pixel ownership test is performed based on the operations 1210 to 1250 is a last pixel included in the frame. If the pixel on which the pixel ownership test is performed is determined as being the last pixel, the vertex shader 1120 terminates the pixel ownership test. Otherwise, the pixel ownership test is performed based on the operations 1210 to 1250 on another pixel.

Referring back to FIG. 11, the pixel shader 1140 performs pixel processing on each of the pixels based on the information of the pixels received from the vertex shader 1120. In other words, the pixel shader 1140 assigns a color value to each of the pixels based on the information of the pixels received from the vertex shader 1120.

First, the pixel shader 1140 or the fragment shader included in the pixel shader 1140 assigns a color value to each pixel or performs fragment shading (1141). The fragment shader may assign a color value to each pixel by using a texture 1142 that is pre-stored.

Then, the pixel shader 1140 performs a post-processing job on each pixel or performs per-fragment operations (1143). The post-processing job may include blending and/ or antialiasing.

The pixel shader 1140 transmits information of a result of the pixel processing to the frame buffer 1150. The frame buffer 1150 stores the information received from the pixel shader 1140.

Figure 13:
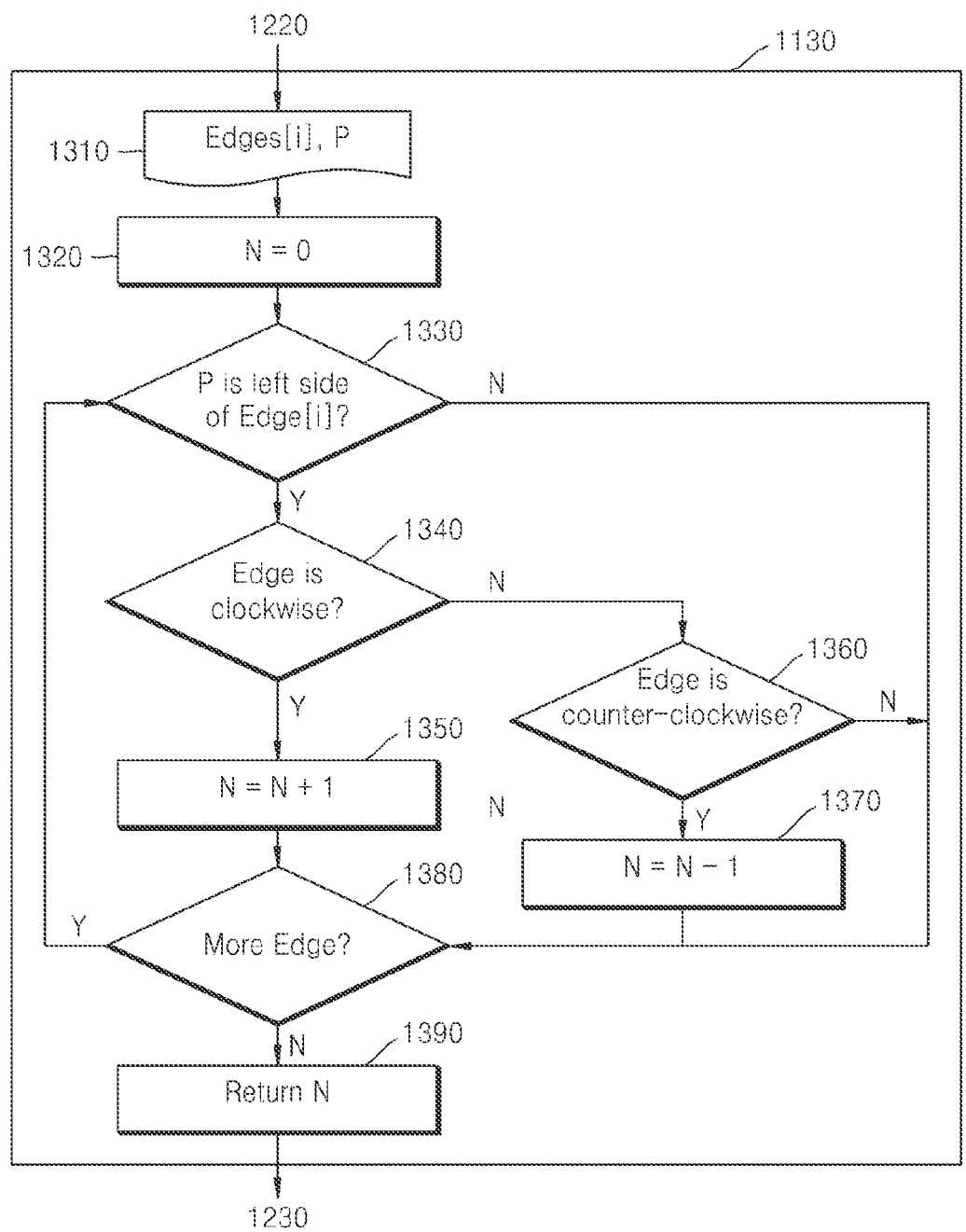
FIG. 13 is a flowchart illustrating an example of a method of calculating a winding number.

FIG. 13 is a flowchart illustrating an example of a method of calculating the winding number. Referring to FIG. 13, the example in which the winding number generator 1130 calculates the winding number includes operations that may be processed in time-series by the operation unit 120 of FIGS. 1 and 7 or the winding number generation apparatus 150 of FIG. 9. Accordingly, although omitted in the following description, the above-described contents regarding the operation unit 120 and the winding number generation apparatus 150 as illustrated in FIGS. 1, 7, and 9 are applied to the following description with reference to FIG. 13.

In Operation 1310, the winding number generator 1130 receives the coordinates of each of vertexes, i.e., "Edge[i]" in FIG. 13, and coordinates of the pixel P, from the vertex shader 1120.

In Operation 1320, the winding number generator 1130 sets the winding number, i.e., "N" in FIG. 13, of the pixel P to 0.

In Operation 1330, the winding number generator 1130 determines whether a path is located at one side of the pixel P. Although in FIG. 13 the winding number generator 1130 determines whether a path is located at a right side of the pixel P, i.e., "P is left side of Edge[i]" in FIG. 13, the present example is not limited thereto. When the path is determined to be located at the right side of the pixel P, the program performs Operation 1340. Otherwise, the program performs Operation 1380. An example in which the winding number generator 1130 determines whether a path is located at one side of the pixel P is described in detail with reference to FIG. 14.

Figure 14:
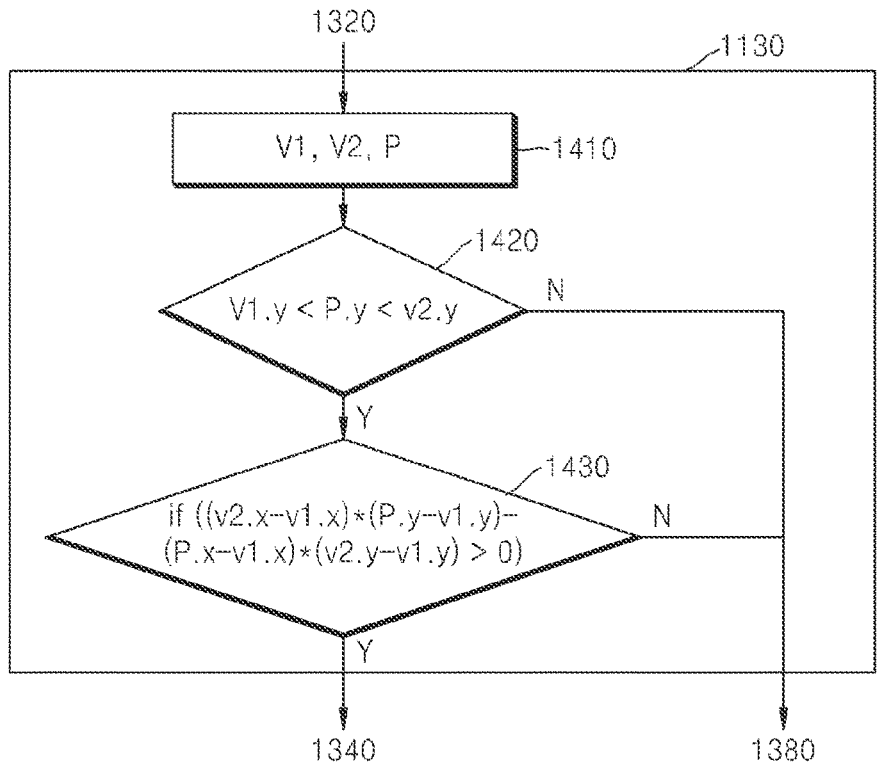
FIG. 14 is a flowchart illustrating an example of a method of determining whether a path is located at one side of a pixel.

FIG. 14 is a flowchart illustrating an example of a method of determining whether a path is located at one side of the pixel P. In the following description, an x coordinate denotes a coordinate corresponding to a horizontal direction of a frame and a y coordinate denotes a coordinate corresponding to a vertical direction of the frame. Also, in the following description, it is assumed that the path is located at the right side of the pixel P, an x coordinate component V2.x of an end point V2 of the path is greater than an x coordinate component V1.x of a start point V1, and a y coordinate component V2.y of the end point V2 of the path is greater than a y coordinate component V1.y of a start point V1. However, the above-described assumptions are provided for convenience of explanation, and the method in which the winding number generator 1130 determines whether a path is located at one side of the pixel P is not limited to the above-described assumptions.

In Operation 1410, the winding number generator 1130 obtains coordinates (V1.x, V1.y) of the start point V1 and coordinates (V2.x, V2.y) of the end point V2 of the path included in the frame, and the coordinates (P.x, P.y) of the pixel P whose winding number is to be calculated.

In Operations 1420 and 1430, the winding number generator 1130 determines whether the path is located at the right side of the pixel P. For example, the winding number generator 1130 determines whether an imaginary half line extended in a horizontal right direction from the pixel P intersects the path. When the imaginary half line intersects the path, the winding number generator 1130 determines that the path is located at the right side of the pixel P. A method in which the winding number generator 1130 checks whether the imaginary half line extended in the horizontal right direction from the pixel P intersects the path is described below.

In Operation 1420, the winding number generator 1130 determines whether a y coordinate component P.y of the pixel P is greater than the y coordinate component V1.y of the start point V1 and less than the y coordinate component V2.y of the end point V2. When the y coordinate component P.y of the pixel P is greater than the y coordinate component V1.y of the start point V1 and less than the y coordinate component V2.y of the end point V2, the program performs Operation 1430. Otherwise, the program performs Operation 1380 of FIG. 13.

In Operation 1430, the winding number generator 1130 calculates a first value that is a product of a difference (V2.x−V1.x) between the x coordinate component V2.x of the end point V2 and the x coordinate component V1.x of the start point V1, and a difference (P.y−V1.y) between the y coordinate component P.y of the pixel P and the y coordinate component V1.y of the start point V1. The winding number generator 1130 calculates a second value that is a product of a difference (P.x−V1.x) between the x coordinate component P.x of the pixel P and the x coordinate component V1.x of the start point V1, and a difference (V2.y−V1.y) between the y coordinate component V2.y of the end point V2 and the y coordinate component V1.y of the start point V1. Then, the winding number generator 1130 determines whether the first value is greater than the second value.

When the first value is greater than the second value, the winding number generator 1130 determines that the imaginary half line extended in the horizontal right direction from the pixel P intersects the path, and then the program performs Operation 1340 of FIG. 13. When the first value is less than or equal to the second value, the winding number generator 1130 determines that the imaginary half line extended in the horizontal right direction from the pixel P does not intersect the path, and then the program performs Operation 1380 of FIG. 13.

Referring back to FIG. 13, in Operation 1340, the winding number generator 1130 determines whether the path located at the right side of the pixel P rotates clockwise. When the path is determined to form a complete circle clockwise, i.e., "Edge is clockwise" in FIG. 13, the program performs Operation 1350. Otherwise, the program performs Operation 1360.

In Operation 1350, the winding number generator 1130 increases the winding number N of the pixel P by 1.

In Operation 1360, the winding number generator 1130 determines whether the path located at the right side of the pixel P rotates counterclockwise. When the path is determined to form a complete circle counterclockwise, i.e., "Edge is counter-clockwise" in FIG. 13, the program performs Operation 1370. Otherwise, the program performs Operation 1380.

In Operation 1370, the winding number generator 1130 decreases the winding number N of the pixel P by 1.

In Operation 1380, the winding number generator 1130 determines whether there is another path. When it is determined that there is another path, i.e., "More Edge" in FIG. 13, the program performs Operation 1330. Otherwise, the program performs Operation 1390.

In Operation 1390, the winding number generator 1130 returns the winding number of the pixel P.

Figure 15:
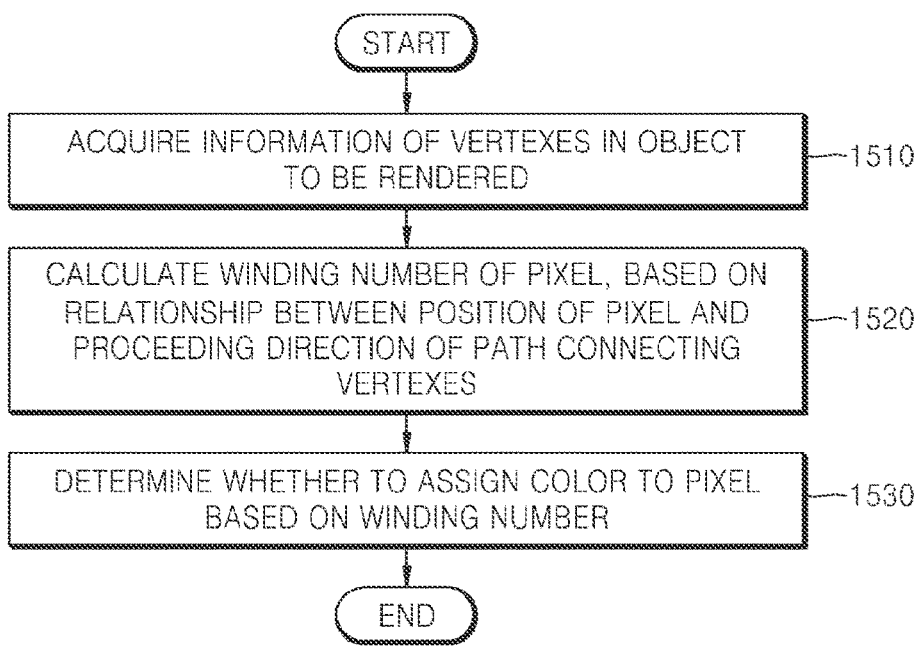
FIG. 15 is a flowchart illustrating an example of a method of performing path rendering.

FIG. 15 is a flowchart illustrating an example of a method of performing path rendering. Referring to FIG. 15, the method of performing path rendering includes operations that may be processed in time-series in the apparatus 100, 101, or 102 for performing path rendering, which are illustrated in FIG. 1, 7, or 9, respectively, or in the GPU 1100, which is illustrated in FIG. 11. Accordingly, it may be understood that, although omitted in the following description, the above-described contents regarding the apparatus 100, 101, or 102 for performing path rendering as illustrated in FIG. 1, 7, or 9, respectively, or regarding the GPU 1100 as illustrated in FIG. 11, are applied to the following description with reference to FIG. 15.

In Operation 1510, the acquisition unit 110 acquires information of vertexes in an object to be rendered. The vertexes correspond to at least one path connecting the vertexes.

In Operation 1520, the operation unit 120 calculates a winding number of each of pixels included in a frame based on a relationship between a position of each of the pixels and a proceeding direction of the at least one path connecting the vertexes.

In Operation 1530, the determination unit 130 determines whether to assign a color to each of the pixels based on the winding number of each of the pixels.

The examples of path rendering described may be performed without using a stencil buffer. Thus, the problems of excessive generation of memory input/output due to a use of the stencil buffer and generation of redundant memory input/output may be solved. Also, since winding numbers with respect to each of pixels included in a frame are generated in parallel, path rendering may be performed at high speed, and high resolution rendering may be achieved over a short period of time.

The various units, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of performing path rendering, the method comprising:
   acquiring information of vertices in an object to be rendered in a frame;
   calculating a winding number of a pixel in the frame, based on a relationship between a position of the pixel and a proceeding direction of a path connecting the vertices, without rendering triangles and without including an object in a stencil buffer; and
   determining whether to assign a color to the pixel, based on the winding number,
   wherein the calculating comprises,
      determining a location of the position of the pixel relative to a center line of the frame,
      determining, based on the determined location, a side of the pixel in which a least number of paths exist with respect to the position of the pixel, and
      determining, as one side of the pixel for the calculating the winding number, the determined side of the pixel in which a least number of paths exist with respect to the position of the pixel.

2. The method of claim 1, wherein the side comprises a left side, a right side, an upper side, or a lower side of the position of the pixel.

3. The method of claim 1, further comprising:
   determining the side, based on the position of the pixel and a position of the path.

4. The method of claim 1, wherein the calculating comprises:
   checking whether the path is located at a side of the pixel;
   determining whether the proceeding direction of the path is clockwise or counterclockwise, based on a result of the checking;
   increasing the winding number by a predetermined value in response to the proceeding direction being determined to be clockwise; and
   decreasing the winding number by the predetermined value in response to the proceeding direction being determined to be counterclockwise.

5. The method of claim 4, wherein the predetermined value is 1.

6. The method of claim 1, wherein the calculating comprises:
   checking whether the path is located at a side of the pixel;
   determining whether the proceeding direction of the path is clockwise or counterclockwise, based on a result of the checking;
   decreasing the winding number by a predetermined value in response to the proceeding direction being determined to be clockwise; and increasing the winding number by the predetermined value in response to the proceeding direction being determined to be counterclockwise.

7. The method of claim 6, wherein the predetermined value is 1.

8. The method of claim 1, further comprising:
setting a bounding box in the frame, based on coordinates of each of the vertices,
wherein the calculating comprises calculating the winding number of the pixel in the bounding box.

9. The method of claim 8, wherein,
the coordinates include horizontal coordinates and vertical coordinates, and
the setting comprises:
setting the bounding box, based on a maximum value and a minimum value of the horizontal coordinates and a maximum value and a minimum value of the vertical coordinates.

10. The method of claim 9, wherein the bounding box is a rectangle comprising a diagonal line connecting a first coordinate that comprises the maximum value of the horizontal coordinates and the maximum value of the vertical coordinates and a second coordinate that comprises the minimum value of the horizontal coordinates and the minimum value of the vertical coordinates.

11. The method of claim 1, wherein the vertices comprise a vertex corresponding to a start position and a vertex corresponding to an end position of each of at least one path.

12. The method of claim 1, wherein the determining comprises:
determining whether to assign a color to the pixel, based on a preset rule.

13. The method of claim 12, wherein the preset rule comprises a first rule in which a color is assigned to each of pixels that has a winding number that is not 0, or a second rule in which a color is assigned to each of pixels that has a winding numbers that is an odd number.

14. The method of claim 1, further comprising:
assigning the color to the pixel, based on a result of the determining; and
storing the color of the pixel.

15. A non-transitory computer readable storage medium storing a program comprising instructions to cause a computer to perform the method of claim 1.

16. An apparatus configured to perform path rendering, the apparatus comprising:
a memory configured to store instructions; and
one or more processors configured to execute the instructions to:
acquire information of vertices in an object to be rendered in a frame;
calculate a winding number of a pixel in the frame, based on a relationship between a position of the pixel and a proceeding direction of a path connecting the vertices, without rendering triangles and without including an object in a stencil buffer; and
determine whether to assign a color to the pixel, based on the winding number,
wherein the one or more processors are configured to calculate the winding number by,
determining a location of the position of the pixel relative to a center line of the frame,
determining, based on the determined location, a side of the pixel in which a least number of paths exist with respect to the position of the pixel, and
determining, as one side of the pixel for the calculating the winding number, the determined side of the pixel in which a least number of paths exist with respect to the position of the pixel.

17. The apparatus of claim 16, wherein the side comprises a left side, a right side, an upper side, or a lower side of the position of the pixel.

18. The apparatus of claim 16, wherein the one or more processors is further configured to:
determine the side, based on the position of the pixel and a position of the path.

19. The apparatus of claim 16, wherein the one or more processors is configured to:
determine whether the proceeding direction of the path is clockwise or counterclockwise;
increase the winding number by a predetermined value in response to the proceeding direction being determined to be clockwise; and
decrease the winding number by the predetermined value in response to the proceeding direction being determined to be counterclockwise.

20. The apparatus of claim 19, wherein the predetermined value is 1.

21. The apparatus of claim 16, wherein the one or more processors is configured to:
determine whether the proceeding direction of the path is clockwise or counterclockwise;
decrease the winding number by a predetermined value in response to the proceeding direction being determined to be clockwise; and
increase the winding number by the predetermined value in response to the proceeding direction being determined to be counterclockwise.

22. The apparatus of claim 21, wherein the predetermined value is 1.

23. The apparatus of claim 16, wherein the one or more processors is further configured to:
set a bounding box in the frame, based on coordinates of each of the vertices,
wherein the one or more processors is configured to calculate the winding number of the pixel in the bounding box.

24. The apparatus of claim 23, wherein,
the coordinates include horizontal coordinates and vertical coordinates, and
the one or more processors is configured to:
set the bounding box, based on the maximum value and a minimum value of horizontal coordinates and the maximum value and a minimum value of vertical coordinates, of the coordinates.

25. The apparatus of claim 24, wherein the bounding box is a rectangle comprising a diagonal line connecting a first coordinate that comprises the maximum value of the horizontal coordinates and the maximum value of the vertical coordinates and a second coordinate that comprises the minimum value of the horizontal coordinates and the minimum value of the vertical coordinates.

26. The apparatus of claim 16, wherein the vertices comprise a vertex corresponding to a start position and a vertex corresponding to an end position of each of at least one path.

27. The apparatus of claim 16, wherein the one or more processors is configured to:
determine whether to assign a color to the pixel, based on a preset rule.

28. The apparatus of claim 27, wherein the preset rule comprises a first rule in which a color is assigned to each of pixels that has a winding number that is not 0, or a second rule in which a color is assigned to each of pixels that has a winding number that is an odd number.

29. The apparatus of claim 16, further comprising:
a pixel shader configured to assign the color to the pixel, based on a result of the determining; and
a frame buffer configured to store the color of the pixel.

30. An apparatus configured to generate a winding number of a pixel in a frame, the apparatus being connected to a graphics processing unit that performs path rendering, and the apparatus comprising:
a processor configured to,
receive information of coordinates of a vertex of a path and information of coordinates of the pixel, from the graphics processing unit,
calculate a winding number of the pixel, based on the information, without rendering triangles and without including an object in a stencil buffer, and
output the winding number to the graphics processing unit, wherein the processor is configured to calculate the winding number by,
determining a location of a position of the pixel relative to a center line of the frame,
determining, based on the determined location, a side of the pixel in which a least number of paths exist with respect to the position of the pixel, and
determining, as one side of the pixel for the calculating the winding number, the determined side of the pixel in which a least number of paths exist with respect to the position of the pixel.

31. An apparatus configured to perform path rendering, the apparatus comprising:
one or more processors configured to,
calculate a winding number of a pixel, based on a direction of a path connecting vertices of an object without rendering triangles and without including the object in a stencil buffer, and
to determine whether to assign a color to the pixel, based on the winding number,
wherein the one or more processors are configured to calculate the winding number by,
determining a location of a position of the pixel relative to a center line of a frame in which the pixel is located,
determining, based on the determined location, a side of the pixel in which a least number of paths exist with respect to the position of the pixel, and
determining, as one side of the pixel for the calculating the winding number, the determined side of the pixel in which a least number of paths exist with respect to the position of the pixel.

32. The apparatus of claim 31, wherein the one or more processors is configured to:
increase the winding number by a predetermined value in response to the direction being determined to be clockwise; and
decrease the winding number by the predetermined value in response to the direction being determined to be counterclockwise.

33. The apparatus of claim 31, wherein the one or more processors is configured to:
assign the color to the pixel in response to the winding number not being zero; or
assign the color to the pixel in response to the winding number being an odd number.

* * * * *